US011077853B2

(12) United States Patent
Oh

(10) Patent No.: US 11,077,853 B2
(45) Date of Patent: Aug. 3, 2021

(54) APPARATUS AND METHOD FOR CONTROLLING LANE-KEEPING

(71) Applicant: MANDO CORPORATION, Pyeongtaek-si (KR)

(72) Inventor: ChangBeom Oh, Seoul (KR)

(73) Assignee: MANDO CORPORATION, Pyeongtaek-si (KR)

(*) Notice: Subject to any disclaimer, the term of this patent is extended or adjusted under 35 U.S.C. 154(b) by 200 days.

(21) Appl. No.: 16/146,033

(22) Filed: Sep. 28, 2018

(65) Prior Publication Data

US 2019/0100212 A1 Apr. 4, 2019

(30) Foreign Application Priority Data

Sep. 29, 2017 (KR) .................. 10-2017-0128107

(51) Int. Cl.
*B60W 30/18* (2012.01)
*G08G 1/04* (2006.01)
(Continued)

(52) U.S. Cl.
CPC ..... *B60W 30/18163* (2013.01); *G08G 1/0112* (2013.01); *G08G 1/04* (2013.01); *G08G 1/163* (2013.01); *G08G 1/166* (2013.01); *G08G 1/167* (2013.01); *B60W 2420/42* (2013.01); *B60W 2554/80* (2020.02); *B60W 2754/10* (2020.02)

(58) Field of Classification Search
None
See application file for complete search history.

(56) References Cited

U.S. PATENT DOCUMENTS 9,043,092 B2 * 5/2015 Ueda ................. B62D 1/28
701/44
2003/0045991 A1 * 3/2003 Isogai ................ B60K 31/18
701/96
(Continued)

FOREIGN PATENT DOCUMENTS

JP 2016139369 A * 8/2016 ........... B62D 15/025
JP 2018001800 A * 1/2018 ............. B60K 31/00
(Continued)

*Primary Examiner* — Shelley Chen
(74) *Attorney, Agent, or Firm* — Morgan, Lewis & Bockius LLP

(57) ABSTRACT

The present disclosure relates to an apparatus and method for controlling lane-keeping. An embodiment provides an apparatus for controlling lane-keeping, including a sensing unit configured to recognize lane lines of a driving lane in which a host vehicle travels and configured to sense a plurality of other vehicles traveling in the driving lane or lanes next to the driving lane, a calculation unit configured to calculate a first transverse separation distance between the sensed other vehicles or a second transverse separation distance between the host vehicle and the other vehicles, a determination unit configured to determine an optimum position of the host vehicle within the driving lane by comparing space widths for the calculated first transverse separation distance and the calculated second transverse separation distance, and an output unit configured to output a speed control signal to control a travel speed of the host vehicle so as to have the host vehicle located at the determined optimum position.

25 Claims, 10 Drawing Sheets

(51) Int. Cl.
*G08G 1/01* (2006.01)
*G08G 1/16* (2006.01)

(56) References Cited

U.S. PATENT DOCUMENTS

| | | | |
|---|---|---|---|
| 2013/0226406 A1* | 8/2013 | Ueda | B62D 1/28 |
| | | | 701/41 |
| 2014/0147007 A1* | 5/2014 | Hayakawa | G08G 1/167 |
| | | | 382/103 |
| 2014/0257686 A1* | 9/2014 | Feldman | B60T 7/22 |
| | | | 701/300 |
| 2016/0185388 A1* | 6/2016 | Sim | B60W 10/20 |
| | | | 701/41 |
| 2016/0221604 A1* | 8/2016 | Yamaoka | B62D 15/025 |
| 2016/0297447 A1* | 10/2016 | Suzuki | B60W 30/18163 |
| 2017/0137033 A1* | 5/2017 | Habu | B60W 30/12 |
| 2018/0043890 A1* | 2/2018 | Keller | G06K 9/00 |
| 2018/0046191 A1* | 2/2018 | Keller | B60W 30/18163 |
| 2019/0035110 A1* | 1/2019 | Shikimachi | G01C 21/3626 |
| 2019/0077459 A1* | 3/2019 | Miura | B62D 15/025 |
| 2019/0092331 A1* | 3/2019 | Ide | B60W 10/20 |
| 2019/0217861 A1* | 7/2019 | Kurahashi | G08G 1/166 |
| 2019/0283757 A1* | 9/2019 | Honda | B60W 30/165 |
| 2020/0198634 A1* | 6/2020 | Yashiro | B60W 60/00274 |

FOREIGN PATENT DOCUMENTS

| | | | | |
|---|---|---|---|---|
| WO | WO-2013018673 A1 * | 2/2013 | | G08G 1/167 |
| WO | WO-2015106914 A1 * | 7/2015 | | G08G 1/04 |

* cited by examiner

APPARATUS AND METHOD FOR CONTROLLING LANE-KEEPING

CROSS REFERENCE TO RELATED APPLICATION

This application claims priority from Korean Patent Application No. 10-2017-0128107, filed on Sep. 29, 2017, which is hereby incorporated by reference for all purposes as if fully set forth herein.

BACKGROUND OF THE INVENTION

1. Field of the Invention

The present disclosure relates to an apparatus and method for controlling lane-keeping. More particularly, the present disclosure relates to a apparatus and method for controlling lane-keeping which are capable of moving a host vehicle to an optimum travel position by controlling a speed of the host vehicle.

2. Description of the Prior Art

A lane-keeping control system, such as a lane keeping assist system (LKAS) or a lane departure warning system (LDWS), is a system that acquires lane information by sensing lanes on the left and right sides of a vehicle using a front camera and provides a steering device of the vehicle with a calculated assist steering torque operable to prevent lane departure of the vehicle or causes the vehicle to follow the center of a lane based on the acquired information, thereby controlling the transverse position of the vehicle and enabling prevention of lane departure and lane-keeping.

However, the conventional lane-keeping control system controls only the transverse position of the vehicle, and therefore cannot be prepared for a dangerous situation where a large vehicle such as a truck is traveling at a close distance to the host vehicle.

For example, when a large vehicle travels at a high speed at a close distance to the host vehicle or travels at a close distance to the host vehicle on a curved road with a large curvature, the steering of the vehicle changes due to the transverse wind caused by the large vehicle, which incurs unnatural steering and leaning of the vehicle to one side, making travel of the host vehicle somewhat unstable.

Therefore, there is a need for a lane-keeping control system capable of relieving anxiety of a driver when the available width of a lane in which the host vehicle travels decreases due to a specific vehicle such as a large vehicle.

SUMMARY OF THE INVENTION

In this background, the present disclosure is to provide an apparatus and method for controlling lane-keeping by controlling the speed of a host vehicle and moving the vehicle to an optimum travel position.

Specifically, the present disclosure is to provide an apparatus and method for controlling lane-keeping by determining the optimum position of a host vehicle by calculating a width of a space at a travelable point on a driving road such that the vehicle moves to the determined position.

To solve the foregoing problem, an embodiment provides a control system for a vehicle, including: an image sensor operable to be disposed on the vehicle so as to have a field of view of an exterior of the vehicle and configured to capture image data; a non-image sensor operable to be disposed on the vehicle so as to sense the exterior of the vehicle and configured to capture sensing data; and one or more processors configured to process at least one of the image data captured by the image sensor and the sensing data captured by the non-image sensor, wherein the control system is configured to: recognize lane lines of a driving lane, in which a host vehicle travels, from the image data and sense a plurality of other vehicles traveling in the driving lane or lanes next to the driving lane from the sensing data; calculate at least one of one or more first transverse separation distances between the other vehicles present on the same transverse line and a second transverse separation distance between the other vehicles present on the same transverse line as the host vehicle; determine an optimum position of the host vehicle within the driving lane by comparing space widths for the calculated first transverse separation distances and the calculated second transverse separation distance; and output a speed control signal to control a travel speed of the host vehicle so as to have the host vehicle located at the determined optimum position.

An embodiment provides a vehicle positioning system, including: an image sensor operable to be disposed on the vehicle so as to have a field of view of an exterior of the vehicle and configured to capture image data; a non-image sensor operable to be disposed on the vehicle so as to sense the exterior of the vehicle and configured to capture sensing data; a Lane Keeping Assist (LKA) module configured to prevent a lane departure of the vehicle; and a controller including at least one processor configured to process at least one of the image data captured by the image sensor and the sensing data captured by the non-image sensor, wherein the vehicle positioning system is configured to: recognize lane lines of a driving lane, in which a host vehicle travels, from the image data and sense a plurality of other vehicles traveling in the driving lane or lanes next to the driving lane from the sensing data; calculate at least one of one or more first transverse separation distances between the other vehicles present on the same transverse line and a second transverse separation distance between the other vehicles present on the same transverse line as the host vehicle; determine an optimum position of the host vehicle within the driving lane by comparing space widths for the calculated first transverse separation distances and the calculated second transverse separation distance; and output a speed control signal to control a travel speed of the host vehicle so as to have the host vehicle located at the determined optimum position.

An embodiment provides a control system for a vehicle, including: a camera operable to be disposed on the vehicle so as to have a field of view of an exterior of the vehicle and configured to capture image data; and a processor configured to process the image data captured by the camera, wherein the control system is configured to: recognize lane lines of a driving lane, in which a host vehicle travels, from the image data and sense a plurality of other vehicles traveling in the driving lane or lanes next to the driving lane from the sensing data; calculate at least one of one or more first transverse separation distances between the other vehicles present on the same transverse line and a second transverse separation distance between the other vehicles present on the same transverse line as the host vehicle; determine an optimum position of the host vehicle within the driving lane by comparing space widths for the calculated first transverse separation distances and the calculated second transverse separation distance; and output a speed control signal to control a travel speed of the host vehicle so as to have the host vehicle located at the determined optimum position.

An embodiment provides a camera suitable for use for a control system of a vehicle, wherein the camera is operable to be disposed on the vehicle so as to have a field of view of an exterior of the vehicle and is configured to capture image data, wherein the image data is used to recognize lane lines of a driving lane in which a host vehicle travels and sense a plurality of other vehicles traveling in the driving lane or lanes next to the driving lane, wherein at least one of one or more first transverse separation distances between the other vehicles present on the same transverse line and a second transverse separation distance between the other vehicles present on the same transverse line as the host vehicle is calculated, wherein an optimum position of the host vehicle is determined within the driving lane by comparing space widths for the calculated first transverse separation distances and the calculated second transverse separation distance, wherein a speed control signal to control a travel speed of the host vehicle is output so as to have the host vehicle located at the determined optimum position.

An embodiment provides a method of operating a control system for a vehicle, the method including: recognizing lane lines of a driving lane in which a host vehicle travels and sensing a plurality of other vehicles traveling in the driving lane or lanes next to the driving lane; calculating a first transverse separation distance between the sensed other vehicles or a second transverse separation distance between the host vehicle and the other vehicles; determining an optimum position of the host vehicle within the driving lane by comparing space widths for the calculated first transverse separation distance and the calculated second transverse separation distance; and outputting a speed control signal to control a travel speed of the host vehicle so as to have the host vehicle located at the determined optimum position.

According to the present embodiments, the optimum driving position of a vehicle is provided, and therefore stability of travel may be secured.

In addition, unstable elements are eliminated during travel of the vehicle. Therefore, the driver's fatigue may be reduced, and convenience may be improved.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
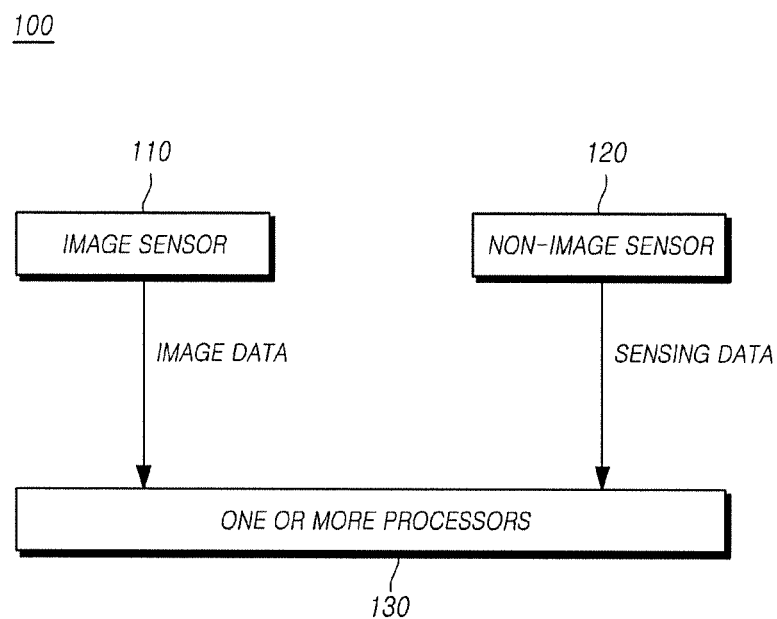
FIG. 1 is a block diagram of a control system for a vehicle according to an embodiment of the present disclosure.

Hereinafter, embodiments of the present disclosure will be described in detail with reference to the accompanying drawings. In adding reference numerals to elements in each drawing, the same elements will be designated by the same reference numerals, if possible, although the elements are shown in different drawings. Further, in the following description of the present disclosure, a detailed description of known functions and configurations incorporated herein will be omitted when it is determined that the description may make the subject matter of the present disclosure rather unclear.

Additionally, in describing the components of the present disclosure, terms like first, second, A, B, (a), and (b) are used. These are solely for the purpose of differentiating one component from another, and one of ordinary skill would understand that the terms are not to imply or suggest the substances, order or sequence of the components. When a component is described as "connected," "coupled," or "linked" to another component, one of ordinary skill in the art would understand the components are not necessarily directly connected, coupled, or linked but also are indirectly "connected," "coupled," or "linked" via a third component.

The control system for a vehicle described in this specification may include a driver assistance system provided in a vehicle, such as a lane keeping assist system (LKAS) or a lane departure warning system (LDWS). The control system for a vehicle is a system that acquires lane information by sensing left and right lanes using an image sensor or a non-image sensor and that provides a steering device of the vehicle with a calculated assist steering torque operable to prevent the lane departure of the vehicle or causes the vehicle to follow the center of a lane based on the acquired information, thereby controlling the transverse position of the vehicle and enabling prevention of lane departure and lane-keeping.

FIG. 1 is a block diagram of a control system for a vehicle according to an embodiment of the present disclosure.

Referring to FIG. 1, the control system for a vehicle according to the present disclosure includes an image sensor 110 operable to be disposed on the vehicle so as to have a field of view of an exterior of the vehicle and configured to capture image data, a non-image sensor 120 operable to be disposed on the vehicle so as to sense the exterior of the vehicle and configured to capture sensing data, one or more processors 130 configured to process at least one of the image data captured by the image sensor and the sensing data captured by the non-image sensor. The control system is configured to recognize lines of a driving lane, in which a host vehicle travels, from the image data and sense a plurality of other vehicles traveling in the driving lane or lanes next to the driving lane from the sensing data, calculate at least one of one or more first transverse separation distances between the other vehicles present on the same transverse line and a second transverse separation distance between the other vehicles present on the same transverse line as the host vehicle, determine an optimum position of the host vehicle within the driving lane by comparing space widths for the calculated first transverse separation distances and the calculated second transverse separation distance, and output a speed control signal to control a travel speed of the host vehicle so as to have the host vehicle located at the determined optimum position.

The image sensor or the camera may include at least one of an image array sensor, such as a complementary metal oxide semiconductor (CMOS) sensor or a charge-coupled device (CCD) sensor, or an extended dynamic range (XDR) camera. The non-image sensor may include at least one of a RADAR sensor, a LIDAR sensor, a Time-of-Flight (TOF) sensor, or an ultrasonic sensor.

The image sensor or the non-image sensor may be located on at least one side or on both sides of the front, rear, left, and right sides of the vehicle. However, the position of the image sensor or the non-image sensor is not limited thereto. The image sensor or the non-image sensor may be installed on any position on the vehicle as long as it is allowed to have a field of view of the exterior of the vehicle or sense the exterior of the vehicle.

The image sensor or the non-image sensor may be implemented in connection with other vehicle systems or may be implemented to operate by utilizing the principles of other vehicle systems, such as a vehicle headlamp control system, a rain sensor, a vehicle vision system, a traffic light recognition system, and a system configured to determine a distance to a foregoing vehicle or an object.

Specifically, the control system functions to sense positions of the plurality of other vehicles located ahead of, on the sides of, and behind the host vehicle from the image data captured by the image sensor or the sensing data captured by the non-image sensor.

The image sensor 110 may photograph a front side region and a rear side region of the host vehicle by mounting a camera device such as a rear view camera on the left and right side mirrors of the host vehicle and may sense the driving environment of the host vehicle from a camera of an around view monitoring system (AVM).

That is, the non-image sensor 120 may include various sensors mounted on the host vehicle, or the control system for the vehicle may receive sensed information from the various sensors and the driving support system through in-vehicle communication.

In this specification, the term "sensing" should be construed as meaning acquiring corresponding information, and includes not only direct sensing by the control system but also acquiring sensed information from an external device.

In one embodiment, the control system may extract another vehicle traveling at a position closer to the host vehicle than the positions of the foregoing vehicle and the following vehicle traveling in the driving lane of the host vehicle. Here, the foregoing vehicle is a vehicle that is traveling in the same lane as the host vehicle and is located immediately ahead of the vehicle, and the following vehicle is a vehicle that is traveling in the same lane as the host vehicle and is located immediately behind the host vehicle.

The control system may calculate the first transverse separation distance between the other vehicles located ahead of the host vehicle and present on the same transverse line or the first transverse separation distance between the other vehicles located behind the host vehicle and present on the same transverse line and may calculate the second transverse separation distance between the other vehicles located on the left side or right side of the host vehicle.

Here, presence of vehicles on the same transverse line represents a case where the longitudinal length of one vehicle has a portion overlapping the longitudinal length of another vehicle in the longitudinal direction. Thus, the first transverse separation distance between other vehicles present on the same transverse line means a straight-line distance between vehicles transversely spaced apart from each other while having lengths overlapping each other in the longitudinal direction. The separation distance is not limited thereto and may indicate a transverse straight-line distance based on the closest parts of the vehicles or indicate a transverse straight-line distance based on the farthest parts of the vehicles.

For example, when a first other vehicle and a second other vehicle are present in lanes next to the lane of the host vehicle and located on the same transverse line as the host vehicle and are traveling ahead of the host vehicle, the first transverse separation distance, which is the distance between the first and second other vehicles, may be calculated. Here, the lanes next to the lane of the host vehicle include lanes on the left and right sides of the lane in which the host vehicle is traveling. On the other hand, when a third other vehicle and a fourth other vehicle present on lanes next to the host vehicle are traveling on the left and right sides of the host vehicle, the second separation distance, which is the distance between the third other vehicle and the fourth other vehicle, may be calculated.

Further, when the other vehicles are not present on the same transverse line, the control system may calculate lane width of the driving lane and the lanes next to the driving lane. The calculated lane width may be set as the first transverse separation distance or the second transverse separation distance.

For example, when there is no other vehicle ahead of the host vehicle, the control system may obtain a sum of a lane width of the driving lane and lane widths of the left and right lanes next to the driving lane and set the sum as the first transverse separation distance. The same operation may also be applied when no other vehicle is present behind or on the left and right sides of the host vehicle. That is, the control system may calculate the lane widths to calculate the space widths, wherein the lane widths may be calculated based on the lane lines of the driving lane and the next lanes recognized by the control system. At this point, the lane widths may be calculated by extracting, using the conventional image processing technique, the lane lines from the front view image captured through the image sensor 110 of the control system and calculating the spacing of the extracted lane lines. Alternatively, the lane widths may be calculated by sensing the positions of the lane lines and the position of a structure, such as a center separator of the road, by receiving information about the structure from the image sensor 110 or the non-image sensor 120.

Further, when another vehicle is present ahead of or behind the host vehicle and in only a lane on one side of the host vehicle, the control system calculates the transverse straight-line distance between the other vehicle present in the lane on one side and a lane line having a longer distance from the other vehicle between the lane lines of a next lane on the opposite side as the first transverse separation distance.

Similarly, when another vehicle is next to the host vehicle and present in only a lane on one side of the host vehicle, the control system calculates the transverse straight-line distance between the other vehicle present in the lane on one side and a lane line having a longer distance from the other vehicle between the lane lines of a next lane on the opposite side as the second transverse separation distance.

Then, the control system may calculate the space widths for an empty space of the driving lane by performing an operation on the first transverse separation distance and the second transverse separation distance based on the vehicle width of the host vehicle and determine the optimum position by comparing the space widths. Here, the control system for the vehicle pre-stores the information about the host vehicle or receives the information about the host vehicle from another system or processor. The information about the host vehicle includes electronic, physical, and mechanical information related to the host vehicle, such as the vehicle width and length of the host vehicle.

For example, a distance value obtained by subtracting the vehicle width from the first transverse separation distance may be the space width. Alternatively, a distance value obtained by subtracting the vehicle width from the sum of the second transverse separation distances on the left and right sides of the host vehicle may be the space width. Alternatively, a distance value obtained by subtracting the vehicle width from the sum of the lane widths on the left and right sides of the host vehicle may be the space width.

Then, the control system may compare the calculated space widths and determine a point having the greatest calculated space width as the optimum position.

In one embodiment, the point having the greatest calculated space width may be set in consideration of the vehicle length of the host vehicle.

That is, the control system may determine the optimum position in a region having the greatest space width in consideration of the vehicle width and vehicle length of the host vehicle.

In one embodiment, the control system for the vehicle may compare the calculated space widths. When the difference between a point having the greatest space width and a point having the second greatest space width is smaller than a preset threshold, the control system may check the vehicle lengths of other vehicles present on transverse sides of the respective points and determine a point at which a smaller sum of vehicle lengths of the other vehicles present on the transverse side is given as the optimum position.

When points having the greatest space width are present ahead of and behind the host vehicle at the same time, the control system may determine the point having the greatest space width located ahead as the optimum position.

That is, when a point having the greatest space width is present ahead of the host vehicle and another point having the greatest space width is present behind the host vehicle, the optimum position may be determined as the point having the greatest space width located ahead of the host vehicle, and the speed control signal may be output to accelerate the host vehicle to move the host vehicle to the optimum position.

When the determined optimum position is ahead of the host vehicle, the control system may output the speed control signal to accelerate the host vehicle. When the optimum position is behind the host vehicle, the control system may output the speed control signal to decelerate the host vehicle.

On the other hand, when the optimum position is the current position of the host vehicle that is traveling, the control system may output the speed control signal to maintain the current travel speed of the host vehicle.

Then, the speed control signal may be transmitted from the control system to the acceleration device or the braking device of the host vehicle to control the travel speed of the host vehicle, namely, control the host vehicle to travel in the longitudinal direction such that the host vehicle reaches the optimum position.

The control system may set a threshold range of the speed of the host vehicle. When the speed of the host vehicle is out of the threshold range during movement of the host vehicle to the optimum position, the control system may output the speed control signal such that the host vehicle travels at the maximum speed or the minimum speed in the threshold range.

Here, the threshold range of the speed may be adaptively changed depending on the driving environment of the host vehicle, for example, the road environment such as a highway, a general road, or an arterial road, or depending on the travel speeds of other vehicles.

For example, suppose that a preset threshold range of the speed of the host vehicle is 60 km/h to 100 km/h. In this case, the control system outputs the speed control signal to move the host vehicle to the optimum position. When the speed of the host vehicle reaches 102 km/h when the host vehicle arrives at the optimum position located ahead, the control system may output the speed control signal to decrease the speed such that the host vehicle travels at 100 km/h, which is the maximum speed of the threshold range.

On the other hand, when the speed of the host vehicle reaches 55 km/h when the host vehicle arrives at the optimum position located behind, the control system may output the speed control signal to increase the speed such that the host vehicle travels at 60 km/h, which is the minimum speed in the threshold range.

Further, when the speed is out of the threshold range before the host vehicle moves to the optimum position, the control system may re-determine the optimum position based on the current position of the host vehicle.

For example, suppose that a preset threshold range of the speed of the host vehicle is 60 km/h to 100 km/h. In this case, when the speed reaches 103 km/h before the host vehicle moves to the optimum position and the host vehicle needs to accelerate further to move to the optimum position, the control system may re-determine the optimum position at the current position of the host vehicle.

In other words, the control system may perform a control operation to receive lane information at the current position of the host vehicle sensed by the image sensor 110 or the non-image sensor 120 and position information about a plurality of other vehicles sensed at the current position. Then, when the first transverse separation distance or the second transverse separation distance sensed at the current position is re-calculated, the control system may re-determine the optimum position of the host vehicle by comparing the space widths for the calculated first transverse separation distance and the calculated second transverse separation distance.

Since the control system according to the present disclosure provides an optimum vehicle travel position as described above, it may secure travel stability, making the driver feel stable.

Figure 2:
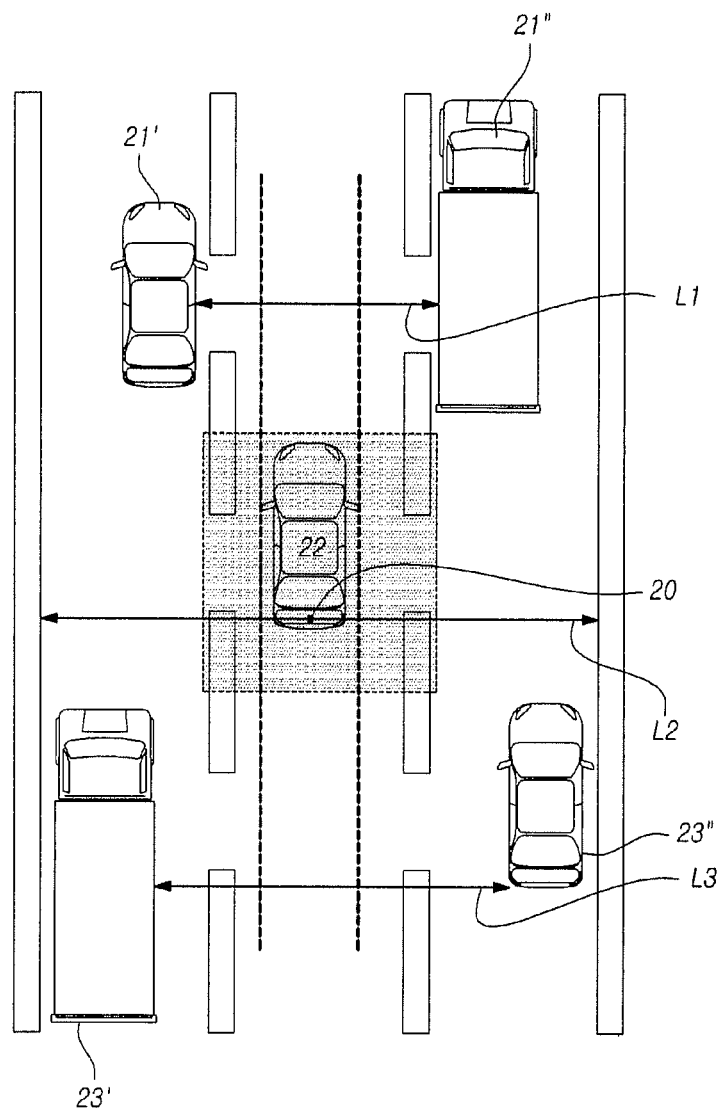
FIG. 2 illustrates an example of space widths according to an embodiment of the present disclosure.

FIG. 2 illustrates an example of space widths according to an embodiment of the present disclosure.

The control system for the host vehicle 22 senses the plurality of other vehicles 21', 21", 23', and 23" located ahead of, on the transverse sides of, and behind the host vehicle through the image sensor 110 or the non-image sensor 120, wherein the other vehicles include large vehicles 21" and 23' or small vehicles 21' and 23" as shown in FIG. 2.

Then, the control system may calculate the first transverse separation distance between the other vehicles and calculate the second transverse separation distance between the other vehicles located on the transverse sides of the host vehicle 22. When there are no other vehicles present on the same transverse line, the control system may calculate lane widths of the driving lane in which the host vehicle 22 travels and the lanes next to the driving lane. When another vehicle present on the same traverse line is only in a lane on one side of the host vehicle, the control system may calculate the transverse straight-line distance between the other vehicle present in the lane on one side and a lane line having a longer distance from the other vehicle between the lane lines of a next lane on the opposite side as the first transverse separation distance or the second transverse separation distance.

Then, the control system may calculate the space widths based on the first transverse separation distance, the second transverse separation distance, and the lane width and determine an optimum position 20 by comparing the space widths.

As shown in FIG. 2, a small vehicle 21' and a large vehicle 21" are located ahead of and on the sides of the host vehicle 22 and a large vehicle 23', and a small vehicle 23" are located on rear lateral sides of the host vehicle 22. The first transverse separation distance corresponding to the separation distance between the large vehicle 21' and the small vehicle 21" located on front lateral sides of the host vehicle 22 is denoted by L1, and the space width for L1 may be a distance obtained by subtracting the vehicle width of the host vehicle 22 from L1.

Further, the first transverse separation distance corresponding to the separation distance between the large vehicle 23' and the small vehicle 23" located on the rear lateral sides of the host vehicle 22 is denoted by L3, and the space width for L3 may be a distance obtained by subtracting the vehicle width of the host vehicle 22 from L3.

Since the other vehicles are not present on the right and left sides of the host vehicle 22, the lane widths may be calculated. The sum of the lane width of the driving lane and the lane width of the lanes next to the driving lane is denoted by L2, and the space width for L2 may be a distance obtained by subtracting the vehicle width of the host vehicle 22 from L2.

Referring to FIG. 2, the point having the greatest space width may be a point on L2. Therefore, the point on L2 may be determined as the optimum position 20. The optimum position 20 may be determined in consideration of the vehicle width and length of the host vehicle 22.

In this case, the optimum position 20 is almost similar to the current position of the host vehicle 22, and therefore the speed control signal may be output to maintain the current travel speed of the host vehicle 22.

Figure 3:
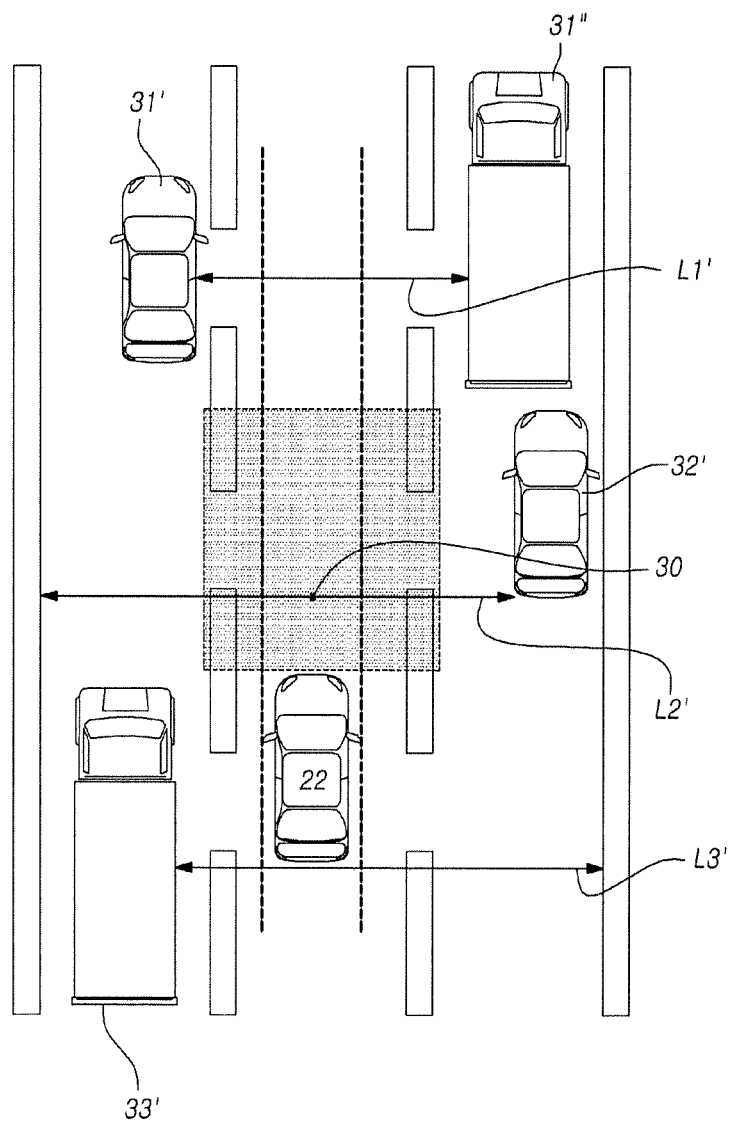
FIG. 3 illustrates another example of space widths according to an embodiment of the present disclosure.

FIG. 3 illustrates another example of space widths according to an embodiment of the present disclosure.

As shown in FIG. 3, it is exemplarily assumed that the small vehicle 23" and 32' located on a rear lateral side of the host vehicle 22 in FIG. 2 has moved to a front lateral side of the host vehicle 22, and the speed of the host vehicle 22 has decreased. A first transverse separation distance between the large vehicle 31" and the small vehicle 31' located on a front lateral side of the host vehicle 22 is denoted by L1', and thus the space width for L1' may be a distance obtained by subtracting the vehicle width of the host vehicle 22 from L1'.

A first transverse separation distance between the small vehicle 32' located on the front right side of the host vehicle 22 and a lane line having a longer distance from the small vehicle 32' between the lane lines of a next lane on the opposite side of the host vehicle is denoted by L2', and thus the space width for L2 may be a distance obtained by subtracting the vehicle width of the host vehicle 22 from L2'.

A second transverse separation distance between the large vehicle 33' located on a rear lateral side of the host vehicle 22 and a lane line having a longer distance from the large vehicle 33' between the lane lines of a next lane on the opposite side is denoted by L3', and the space width for L3' may be a distance obtained by subtracting the vehicle width of the host vehicle 22 from L3'.

Therefore, in FIG. 3, since the point having the greatest space width may be a point on L2', the point on L2' may be determined as the optimum position 30. The optimum position 30 may be determined in consideration of the vehicle width and length of the host vehicle 22.

That is, in FIG. 3, the optimum position 30 is located ahead of the current position where the host vehicle 22 is traveling, and therefore the speed control signal may be output again to increase the current travel speed of the host vehicle 22.

Figure 4:
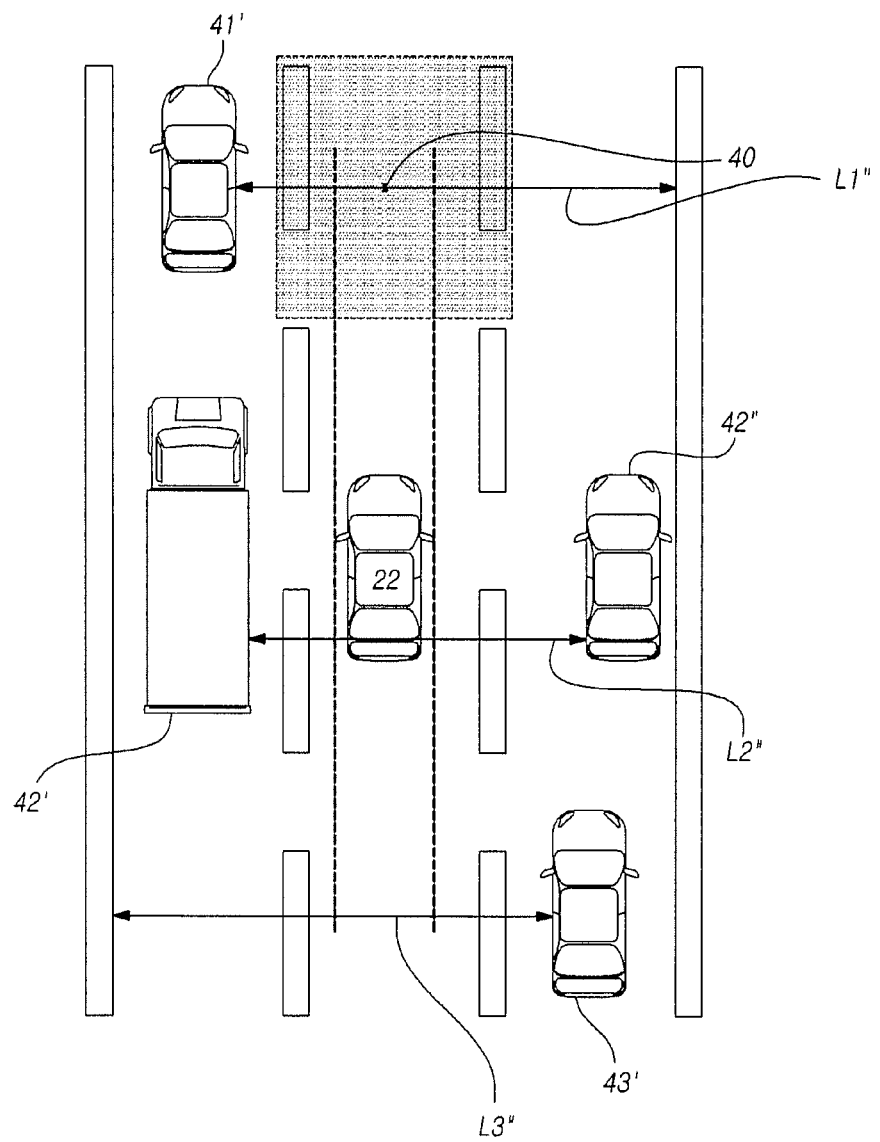
FIG. 4 illustrates still another example of space widths according to an embodiment of the present disclosure.

FIG. 4 illustrates still another example of space widths according to an embodiment of the present disclosure.

As shown in FIG. 4, small vehicles 41' and 43' are located on a front lateral side and a rear lateral side of the host vehicle 22, respectively, and a large vehicle 42' and a small vehicle 42" are located on the front left and right sides of the host vehicle 22. In this case, a first transverse separation distance between the small vehicle 41' located on the front left side of the host vehicle 22 and a lane line having a longer distance from the small vehicle 41' between the lane lines of a next lane on the opposite side of the host vehicle is denoted by is denoted by L1", and the space width for L1" may be a distance obtained by subtracting the vehicle width of the host vehicle 22 from L1".

The sum of the second transverse separation distances for the large vehicle 42' located on the left side of the host vehicle 22 and the small vehicle 42" on the right side of the host vehicle 22 is denoted by L2", and thus the space width for L2" may be a distance obtained by subtracting the vehicle width of the host vehicle 22 from L2".

A first transverse separation distance between the small vehicle 43' located on the rear right side of the host vehicle 22 and a lane line having a longer distance from the small vehicle 43' between the lane lines of a next lane on the opposite side of the host vehicle is denoted by L3", and thus the space width for L3" may be a distance obtained by subtracting the vehicle width of the host vehicle 22 from L3".

Referring to FIG. 4, the points having the greatest space width may be on L1" and L3". However, since the host vehicle 22 is traveling forward in a straight line, the point on L1" not on L3" may be selected as a point having the greatest space width, and the optimum position may be determined on L1" in consideration of the vehicle width and the vehicle length.

That is, in FIG. 4, since the optimum position 40 is located ahead of the current position of the host vehicle 22, the speed control signal may be output again to increase the current travel speed of the host vehicle 22.

Although the embodiment described above illustrates a procedure of the lane-keeping control apparatus 100 of the present disclosure setting the optimum positions 20, 30, and 40 in an exemplary case where the positions of the other vehicles and the host vehicle 22 change in real time on a straight road, the present disclosure is not limited to this case.

Figure 5:
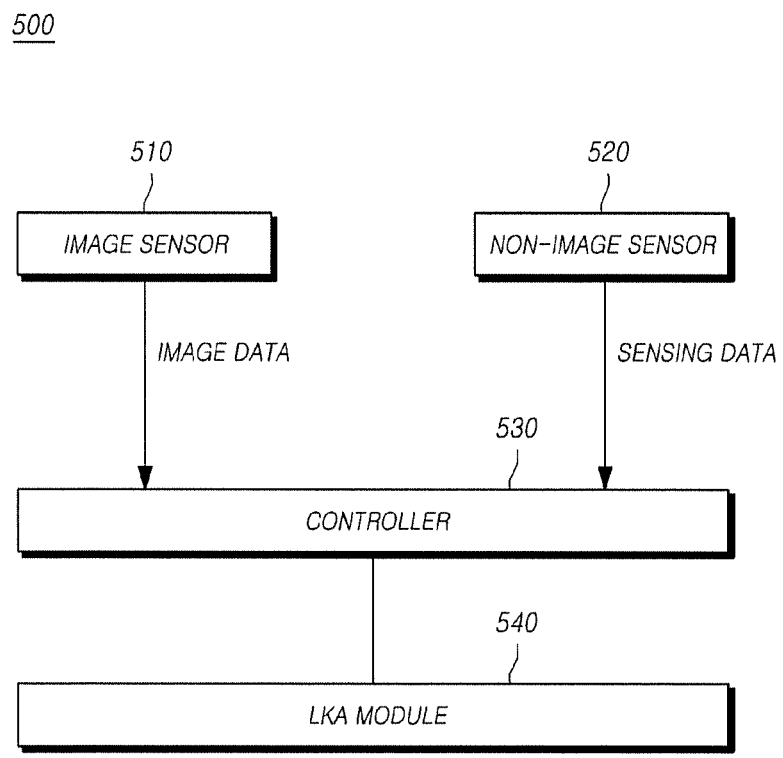
FIG. 5 is a block diagram of a vehicle positioning system according to an embodiment of the present disclosure.

FIG. 5 is a block diagram of a vehicle positioning system 500 according to an embodiment of the present disclosure.

The vehicle positioning system 500 of the present disclosure shown in FIG. 5 includes an image sensor 510 operable to be disposed on the vehicle so as to have a field of view of an exterior of the vehicle and configured to capture image data, a non-image sensor 520 operable to be disposed on the vehicle so as to sense the exterior of the vehicle and configured to capture sensing data, a Lane Keeping Assist (LKA) module 540 configured to prevent a lane departure of the vehicle, and a controller 530 including at least one processor configured to process at least one of the image data captured by the image sensor and the sensing data captured by the non-image sensor.

The image sensor 510, the non-image sensor 520 and the controller 530 included in the vehicle positioning system 500 shown in FIG. 5 can be explained based on the details of the image sensor 110, the non-image sensor 120 and the processor 130 of the vehicle control system 100 shown in FIG. 1, and therefore will not be described in detail below.

The LKA module 540 is a system configured to automatically prevent the vehicle from departing a lane during travel of the vehicle. The LKA module 540 may recognize the center line or lane lines using the data received from the image sensor 510 or the non-image sensor 520. When the vehicle departs the lane, the LKA module 540 may provide a notification to the driver by vibration of the steering wheel or warning sound or may even help the vehicle to travel in the lane by controlling the steering wheel.

The vehicle positioning system 500 is configured to recognize lane lines of a driving lane, in which a host vehicle travels, from the image data and sense a plurality of other vehicles traveling in the driving lane or a lane next to the driving lane from the sensing data, calculate at least one of one or more first transverse separation distances between the other vehicles present on the same transverse line and a second transverse separation distance between the other vehicles present on the same transverse line as the host vehicle, determine an optimum position of the host vehicle within the driving lane by comparing space widths for the calculated first transverse separation distances and the calculated second transverse separation distance, and output a speed control signal to control a travel speed of the host vehicle so as to have the host vehicle located at the determined optimum position.

The description of the operation of the control system 100 for a vehicle shown in FIG. 1 may be referred to for the detailed operation of the vehicle positioning system 500 shown in FIG. 5, and therefore the operation of the vehicle positioning system 500 will not be described in detail below.

Figure 6:
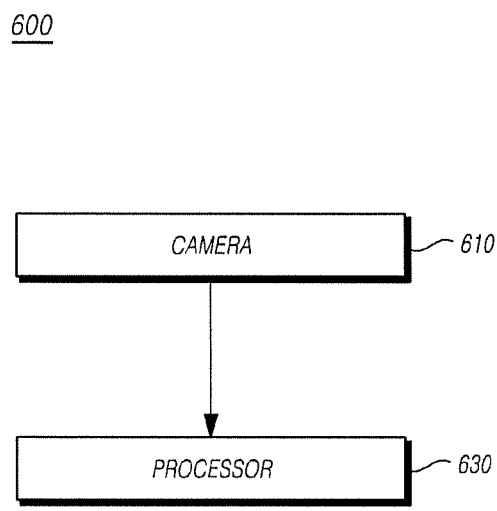
FIG. 6 is a block diagram of a control system for a vehicle according to an embodiment of the present disclosure.

FIG. 6 is a block diagram of a control system 600 for a vehicle according to an embodiment of the present disclosure.

The control system 600 of the present disclosure shown in FIG. 6 includes a camera 610 operable to be disposed on the vehicle so as to have a field of view of an exterior of the vehicle and configured to capture image data, and a processor 630 configured to process the image data captured by the camera 610.

The camera 610 and the processor 630 included in the control system 600 shown in FIG. 6 can be explained based on the details of the image sensor 110 and the processor 130 of the control system 100 shown in FIG. 1, and therefore will not be described in detail below.

Specifically, the control system 600 is configured to recognize lane lines of a driving lane, in which a host vehicle travels, from the image data and sense a plurality of other vehicles traveling in the driving lane or a lane next to the driving lane from the sensing data, calculate at least one of one or more first transverse separation distances between the other vehicles present on the same transverse line and a second transverse separation distance between the other vehicles present on the same transverse line as the host vehicle, determine an optimum position of the host vehicle within the driving lane by comparing space widths for the calculated first transverse separation distances and the calculated second transverse separation distance, and output a speed control signal to control a travel speed of the host vehicle so as to have the host vehicle located at the determined optimum position.

The description of the operation of the control system 100 for a vehicle shown in FIG. 1 may be referred to for the detailed operation of the control system 600 shown in FIG. 6, and therefore the operation of the control system 600 will not be described in detail below.

Figure 7:
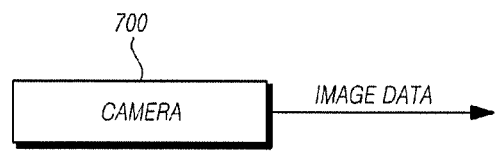
FIG. 7 illustrates a camera according to an embodiment of the present disclosure.

FIG. 7 illustrates a camera 700 according to an embodiment of the present disclosure.

The camera 700 shown in FIG. 7 is suitable for use for a control system of a vehicle and is operable to be disposed on the vehicle so as to have a field of view of an exterior of the vehicle and is configured to capture image data. The camera 700 of FIG. 7 can be explained based on the details of the image sensor 110 of the control system 100 shown in FIG. 1 and therefore will not be described in detail below.

The image data captured by the camera 700 is used to recognize lane lines of a driving lane, in which a host vehicle travels, from the image data and sense a plurality of other vehicles traveling in the driving lane or a lane next to the driving lane. Thereby, at least one of one or more first transverse separation distances between other vehicles present on the same transverse line and a second transverse separation distance between other vehicles present on the same transverse line as the host vehicle may be calculated, an optimum position of the host vehicle within the driving lane may be determined by comparing space widths for the calculated first transverse separation distances and the calculated second transverse separation distance, and a speed control signal to control a travel speed of the host vehicle may be output so as to have the host vehicle located at the determined optimum position.

Figure 8:
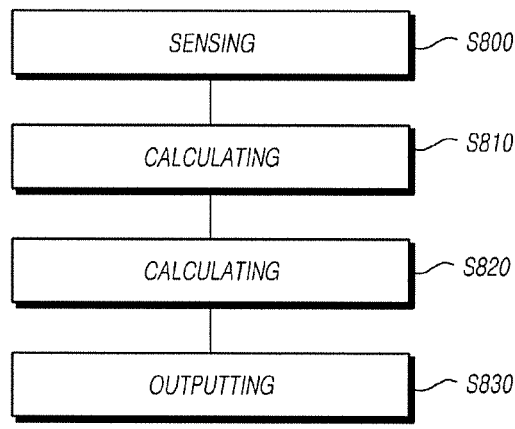
FIG. 8 is a flowchart of a method of operating a control system for a vehicle according to an embodiment of the present disclosure.

FIG. 8 is a flowchart of a method of operating a control system for a vehicle according to an embodiment of the present disclosure.

A method of controlling lane-keeping according to the present disclosure may include recognizing lane lines of a driving lane in which a host vehicle travels and sensing a plurality of other vehicles traveling in the driving lane or a lane next to the driving lane (S800), calculating a first transverse separation distances between the sensed other vehicles or a second transverse separation distance between the host vehicle and the other vehicles (S810), determining an optimum position of the host vehicle within the driving lane by comparing space widths for the calculated first transverse separation distance and the calculated second transverse separation distance (S820), and outputting a speed control signal to control a travel speed of the host vehicle so as to have the host vehicle located at the determined optimum position (S830).

Specifically, the sensing (S800) is an operation of performing a function of sensing the positions of the plurality of other vehicles located ahead of, on the sides of, and behind the host vehicle. In the sensing (S800), the travel environment of the host vehicle may be sensed by all devices capable of sensing the front, sides and even the blind spot.

In the calculating (S810), the first transverse separation distance, which is a separation distance between the other vehicles located ahead of the host vehicle and present on the same transverse line or a separation distance between the other vehicles located behind the host vehicle and present on the same transverse line, may be calculated, and the second transverse separation distance between the other vehicles located on the left side or right side of the host vehicle may be calculated.

In addition, in the calculating (S810), when the other vehicles are not present on the same transverse line, lane widths of the driving lane and the lanes next to the driving lane may be calculated. Alternatively, the lane widths may be calculated by sensing the positions of the lane lines and the position of a structure such as a center separator of the road by receiving information about the structure from the image sensor or the non-image sensor.

In the determining (S820), the space widths for an empty space of the driving lane may be calculated by performing an operation on the first transverse separation distance and the second transverse separation distance based on the vehicle width of the host vehicle. Here, the control system for the vehicle pre-stores information about the host vehicle or receives the information about the host vehicle from another system or processor. The information about the host vehicle includes physical and mechanical information related to the host vehicle, such as the vehicle width and length of the host vehicle.

Then, in the determining (S820), the calculated space widths may be compared, and a point having the greatest calculated space width may be determined as the optimum position.

In one embodiment, the point having the greatest calculated space width may be set in consideration of the vehicle length of the host vehicle.

In one embodiment, the control system for the vehicle may compare the calculated space widths. When the difference between a point having the greatest space width and a point having the second greatest space width is smaller than a preset threshold, the control system may check the vehicle lengths of other vehicles present on transverse sides of the respective points and determine a point at which a smaller sum of vehicle lengths of the other vehicles present on the transverse side is given as the optimum position.

In addition, in the determining (S820), when points having the greatest space width are present ahead of and behind the host vehicle at the same time, the point having the greatest space width located ahead may be determined as the optimum position.

In the outputting (S830), when the optimum position is ahead of the host vehicle, the speed control signal may be output to accelerate the host vehicle. When the optimum position is behind the host vehicle, the speed control signal may be output to decelerate the host vehicle.

On the other hand, in the outputting (S830), when the optimum position is the current position of the host vehicle that is traveling, the control system may output the speed control signal to maintain the current travel speed of the host vehicle.

In addition, in the outputting (S830), a threshold range of the speed of the host vehicle may be set. When the speed of the host vehicle is out of the threshold range during movement of the host vehicle to the optimum position, the speed control signal may be output such that the host vehicle travels at the maximum speed or the minimum speed in the threshold range.

Then, in the determining (S820), when the speed is out of the threshold range before the host vehicle moves to the optimum position, the optimum position may be re-determined based on the current position of the host vehicle.

That is, a control operation may be performed to re-calculate the first transverse separation distance or the second transverse separation distance at the current position in the calculating (S810) based on the lane information at the current position of the host vehicle sensed in the sensing (S800) and the position information about a plurality of other vehicles sensed at the current position. Then, in the determining (S820), the optimum position of the host vehicle may be re-determined by comparing the space widths for the calculated first transverse separation distance and the calculated second transverse separation distance.

Figure 9:
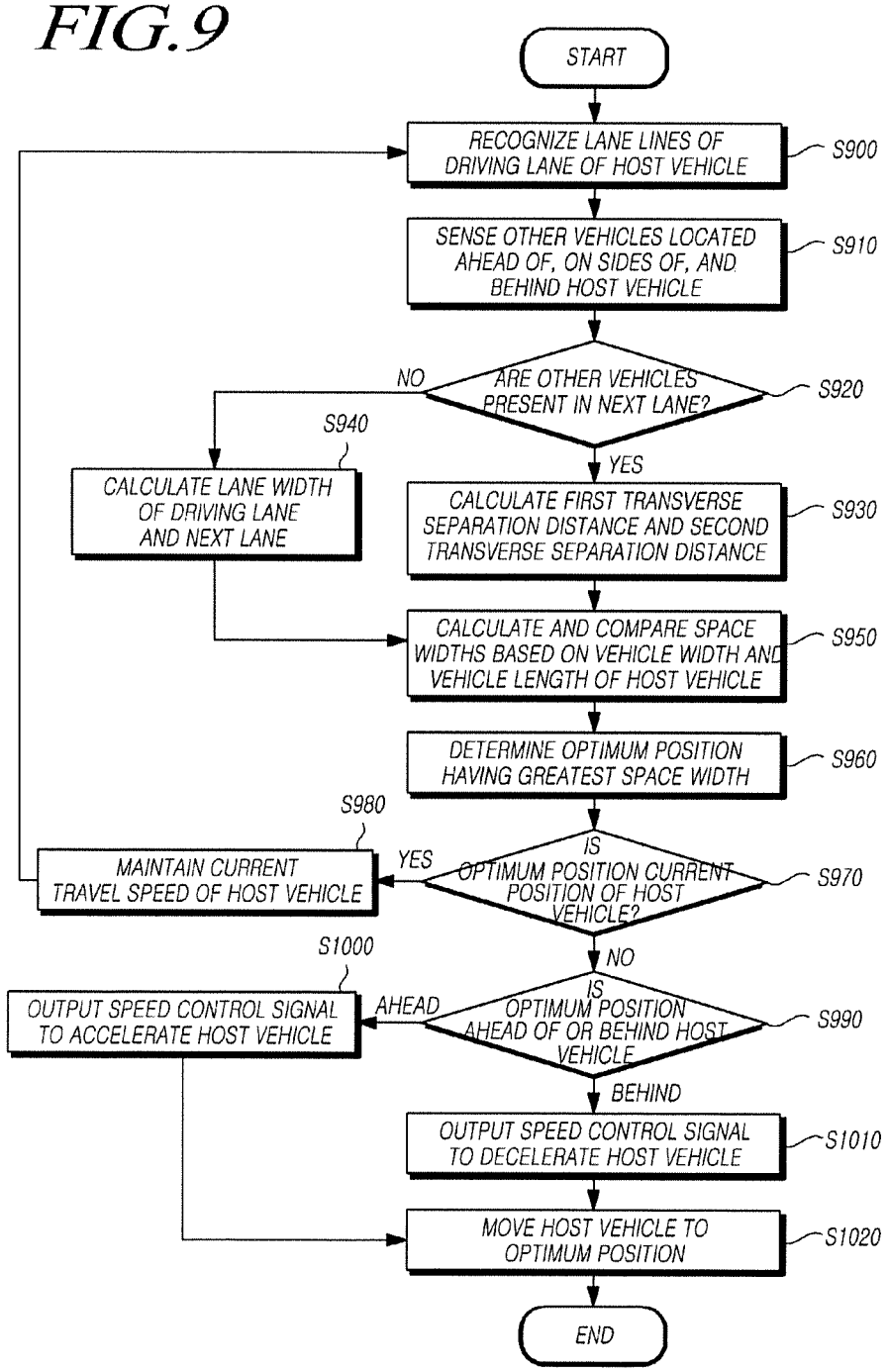
FIG. 9 is a detailed flowchart of a method of operating a control system for a vehicle according to an embodiment of the present disclosure.

FIG. 9 is a detailed flowchart of a method of operating a control system for a vehicle according to an embodiment of the present disclosure.

Referring to FIG. 9, the lane lines of a driving lane in which the host vehicle travels are recognized (S900). Then, the plurality of other vehicles located ahead of, on the sides of, and behind the host vehicle are sensed (S910).

Then, it is determined whether the other vehicles are present in the next lanes (S920). At this point, when the other vehicles are present in the next lanes, the first transverse separation distance between the other vehicles located ahead of the host vehicle and present on the same transverse line or the first transverse separation distance between the other vehicles located behind the host vehicle and present on the same transverse line is calculated, and the second transverse separation distance between the other vehicles located on the left side or right side of the host vehicle is calculated (S930).

On the other hand, when there are no other vehicles present on the same transverse line, the lane widths of the driving lane and the next lanes are calculated (S940).

That is, the lane widths are calculated to calculate the space widths. The lane widths may be calculated based on the driving lane and the lane lines of the next lanes.

Then, the first transverse separation distance, the second transverse separation distance, and the lane widths are calculated based on the pre-stored vehicle width and length of the host vehicle to calculate the space widths, and the calculated space widths are compared with each other (S950).

Then, a point having the greatest space width is determined as the optimum position (S960). The control system for the vehicle may determine the optimum position in a region having the greatest space width in consideration of at least one of the vehicle width of the host vehicle, the vehicle length of the host vehicle, and the vehicle lengths of the other vehicles.

At this point, it is determined whether the optimum position is the current position of the host vehicle that is traveling (S970). When the optimum position is the current position of the host vehicle, the current travel speed of the host vehicle is maintained (S980), and sensing other vehicles located around the host vehicle is repeated until the optimum position is changed.

On the other hand, when the optimum position is not the current position of the host vehicle, it is determined whether the optimum position is located ahead of or behind the host vehicle (S990).

Then, in the outputting (S830), when the optimum position is located ahead of the host vehicle, a speed control signal is output to accelerate the host vehicle by increasing the current travel speed of the host vehicle (S1000).

On the other hand, when the optimum position is located behind the host vehicle, the speed control signal is output to decelerate the host vehicle by decreasing the current travel speed of the host vehicle (S1010).

Then, the speed control signal is transmitted to the acceleration device or the braking device of the host vehicle to control the travel speed of the host vehicle such that the host vehicle moves to the optimum position (S1020).

Figure 10:
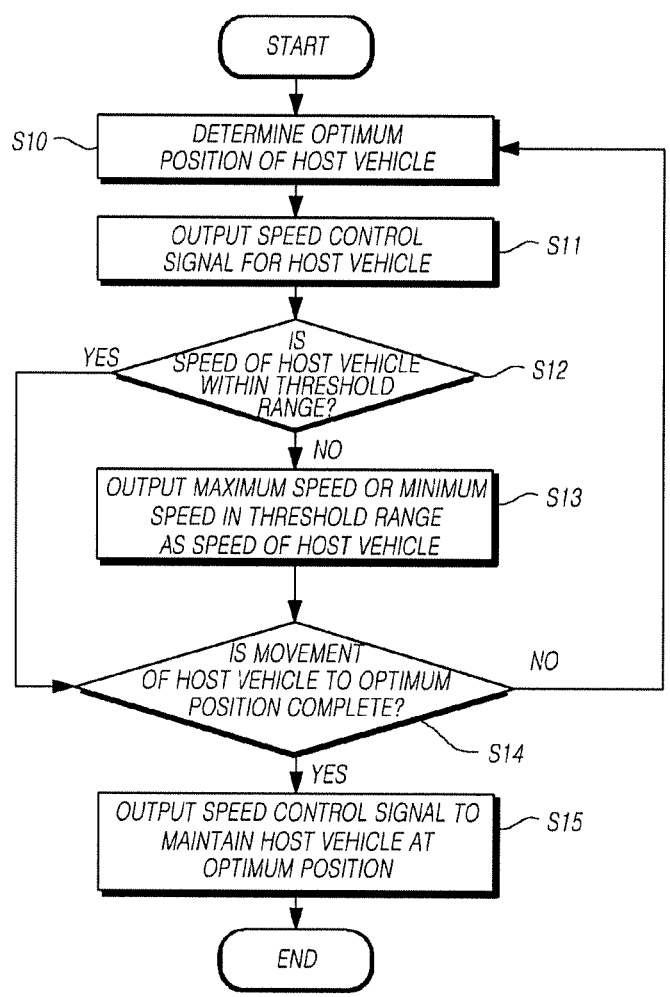
FIG. 10 is a flowchart of a method of resetting an optimum position in a method of operating a control system for a vehicle according to an embodiment of the present disclosure.

FIG. 10 is a flowchart of a method of resetting an optimum position in a method of operating a control system for a vehicle according to an embodiment of the present disclosure.

Referring to FIG. 10, in the determining (S820), the optimum position of the host vehicle is determined (S10).

Then, in the outputting (S830), a speed control signal to increase the current travel speed of the host vehicle is output when the optimum position is located ahead of the host vehicle, and a speed control signal to decrease the current travel speed of the host vehicle is output when the optimum position is located behind the host vehicle (S11).

When the host vehicle is moving to the optimum position, it is determined whether the speed is out of a preset threshold range of the speed of the host vehicle (S12).

When the speed of the host vehicle is out of the threshold range, the speed control signal is output such that the host vehicle travels at a maximum speed or a minimum speed within the threshold range (S13).

For example, when the host vehicle is traveling at a travel speed higher than the maximum speed in the threshold range, the maximum speed in the threshold range is output as the travel speed. When the host vehicle is traveling at a travel speed lower than the minimum speed in the threshold range, the minimum speed in the threshold range is output as the travel speed.

On the other hand, in the determining (S820), when the speed of the host vehicle is within the threshold range, it is checked whether the host vehicle has completed movement to the optimum position (S14).

When the host vehicle has not completed movement to the optimum position, the optimum position of the host vehicle is re-determined (S10).

On the other hand, when the host vehicle has completed movement to the optimum position, the speed control signal is output to maintain the host vehicle at the optimum position (S15).

As described above, the apparatus and method for controlling lane-keeping of the present disclosure may secure stability of travel by providing an optimum vehicle travel position in real time and may reduce the driver's fatigue and improve convenience by eliminating unstable elements during travel of the vehicle.

One of ordinary skill would understand that terms such as "include," "comprise," and "have" are to be interpreted as inclusive or open rather than exclusive or closed unless expressly defined to the contrary. All the terms that are technical or scientific agree with meanings understood by a person skilled in the art unless defined to the contrary. One of ordinary skill would understand common terms as found in dictionaries are to be interpreted in the context of the related technical writings not too ideally or impractically unless the present disclosure expressly defines them so.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A control system for a vehicle, comprising:
   an image sensor operable to be disposed on the vehicle so as to have a field of view of an exterior of the vehicle and configured to capture image data;
   a non-image sensor operable to be disposed on the vehicle so as to sense the exterior of the vehicle and configured to capture sensing data; and
   one or more processors configured to process at least one of the image data captured by the image sensor and the sensing data captured by the non-image sensor,
   wherein the control system is configured to:
   recognize lane lines of a driving lane, in which a host vehicle travels, from the image data and sense a plurality of other vehicles traveling in the driving lane or lanes next to the driving lane from the sensing data;
   calculate at least one of one or more first transverse separation distances between the other vehicles present on the same transverse line and a second transverse separation distance between the other vehicles present on the same transverse line as the host vehicle;
   determine an optimum position of the host vehicle within the driving lane by comparing space widths for the calculated first transverse separation distances and the calculated second transverse separation distance; and
   output a speed control signal to control a travel speed of the host vehicle so as to have the host vehicle located at the determined optimum position.

2. The control system of claim 1, wherein the control system senses positions of the plurality of other vehicles located ahead of, on sides of, and behind the host vehicle.

3. The control system of claim 1, wherein the control system calculates at least one of a first transverse separation distance between the other vehicles located ahead of the host vehicle and present on the same transverse line, a first transverse separation distance between the other vehicles located behind the host vehicle and present on the same transverse line, and a second transverse separation distance between the other vehicles present on the same transverse line as the host vehicle.

4. The control system of claim 1, wherein, when the other vehicles are not present on the same transverse line, the control system calculates a lane width of the driving lane and the lanes next to the driving lane and uses the lane width as the first transverse separation distance or the second transverse separation distance.

5. The control system of claim 1, wherein the control system calculates the space widths for an empty space of the driving lane by performing an operation on the first transverse separation distances and the second transverse separation distance based on a pre-stored vehicle width of the host vehicle and determines the optimum position by comparing the space widths.

6. The control system of claim 5, wherein the control system determines a point having the greatest calculated space width as the optimum position.

7. The control system of claim 5, wherein the control system further checks vehicle length information about the host vehicle and vehicle length information about the other vehicles,
   wherein the control system uses at least one of the vehicle length information about the host vehicle and the vehicle length information about the other vehicles in determining the optimum position.

8. The control system of claim 5, wherein, when points having the greatest space width are present ahead of and behind the host vehicle at the same time, the control system determines the point having the greatest space width and located ahead of the host vehicle as the optimum position.

9. The control system of claim 1, wherein the control system outputs the speed control signal to accelerate the host vehicle when the optimum position is ahead of the host vehicle, and outputs the speed control signal to decelerate the host vehicle when the optimum position is behind the host vehicle.

10. The control system of claim 1, wherein the control system sets a threshold range of the speed of the host vehicle,
wherein, when the speed of the host vehicle is out of the threshold range during movement of the host vehicle to the optimum position, the control system outputs the speed control signal such that the host vehicle travels at a maximum speed or a minimum speed in the threshold range.

11. The control system of claim 10, wherein, when the speed is out of the threshold range before the host vehicle moves to the optimum position, the control system re-determines the optimum position based on a current position of the host vehicle.

12. A vehicle positioning system, comprising
an image sensor operable to be disposed on the vehicle so as to have a field of view of an exterior of the vehicle and configured to capture image data;
a non-image sensor operable to be disposed on the vehicle so as to sense the exterior of the vehicle and configured to capture sensing data;
a Lane Keeping Assist (LKA) module configured to prevent a lane departure of the vehicle; and
a controller comprising at least one processor configured to process at least one of the image data captured by the image sensor and the sensing data captured by the non-image sensor,
wherein the vehicle positioning system is configured to:
recognize lane lines of a driving lane, in which a host vehicle travels, from the image data and sense a plurality of other vehicles traveling in the driving lane or lanes next to the driving lane from the sensing data;
calculate at least one of one or more first transverse separation distances between the other vehicles present on the same transverse line and a second transverse separation distance between the other vehicles present on the same transverse line as the host vehicle;
determine an optimum position of the host vehicle within the driving lane by comparing space widths for the calculated first transverse separation distances and the calculated second transverse separation distance; and
output a speed control signal to control a travel speed of the host vehicle so as to have the host vehicle located at the determined optimum position.

13. The vehicle positioning system of claim 12, wherein the vehicle positioning system senses positions of the plurality of other vehicles located ahead of, on sides of, and behind the host vehicle.

14. The vehicle positioning system of claim 12, wherein the vehicle positioning system calculates at least one of a first transverse separation distance between the other vehicles located ahead of the host vehicle and present on the same transverse line, a first transverse separation distance between the other vehicles located behind the host vehicle and present on the same transverse line, and a second transverse separation distance between the other vehicles present on the same transverse line as the host vehicle.

15. The vehicle positioning system of claim 12, wherein, when the other vehicles are not present on the same transverse line, the vehicle positioning system calculates a lane width of the driving lane and the lanes next to the driving lane and uses the lane width as the first transverse separation distance or the second transverse separation distance.

16. The vehicle positioning system of claim 12, wherein the vehicle positioning system calculates the space widths for an empty space of the driving lane by performing an operation on the first transverse separation distances and the second transverse separation distance based on a stored vehicle width of the host vehicle and determines the optimum position by comparing the space widths.

17. The vehicle positioning system of claim 16, wherein the vehicle positioning system determines a point having the greatest calculated space width as the optimum position.

18. The vehicle positioning system of claim 16, wherein, when points having the greatest space width are present ahead of and behind the host vehicle at the same time, the vehicle positioning system determines the point having the greatest space width and located ahead of the host vehicle as the optimum position.

19. A control system for a vehicle, comprising:
a camera operable to be disposed on the vehicle so as to have a field of view of an exterior of the vehicle and configured to capture image data; and
a processor configured to process the image data captured by the camera,
wherein the control system is configured to:
recognize lane lines of a driving lane, in which a host vehicle travels, from the image data and sense a plurality of other vehicles traveling in the driving lane or lanes next to the driving lane from the sensing data;
calculate at least one of one or more first transverse separation distances between the other vehicles present on the same transverse line and a second transverse separation distance between the other vehicles present on the same transverse line as the host vehicle;
determine an optimum position of the host vehicle within the driving lane by comparing space widths for the calculated first transverse separation distances and the calculated second transverse separation distance; and
output a speed control signal to control a travel speed of the host vehicle so as to have the host vehicle located at the determined optimum position.

20. The control system of claim 19, wherein the control system senses positions of the plurality of other vehicles located ahead of, on sides of, and behind the host vehicle.

21. The control system of claim 19, wherein the control system calculates at least one of a first transverse separation distance between the other vehicles located ahead of the host vehicle and present on the same transverse line, a first transverse separation distance between the other vehicles located behind the host vehicle and present on the same transverse line, and a second transverse separation distance between the other vehicles present on the same transverse line as the host vehicle.

22. The control system of claim 19, wherein, when the other vehicles are not present on the same transverse line, the control system calculates a lane width of the driving lane and the lanes next to the driving lane and uses the lane width as the first transverse separation distance or the second transverse separation distance.

23. The control system of claim 19, wherein the control system calculates the space widths for an empty space of the driving lane by performing an operation on the first transverse separation distances and the second transverse separation distance based on a stored vehicle width of the host vehicle and determines the optimum position by comparing the space widths.

24. The control system of claim 23, wherein the control system determines a point having the greatest calculated space width as the optimum position.

25. The control system of claim 23, wherein, when points having the greatest space width are present ahead of and behind the host vehicle at the same time, the control system determines the point having the greatest space width and located ahead of the host vehicle as the optimum position.

\* \* \* \* \*